US010946713B2

(12) United States Patent
Seki et al.

(10) Patent No.: US 10,946,713 B2
(45) Date of Patent: Mar. 16, 2021

(54) HEAT CIRCULATION SYSTEM FOR VEHICLE

(71) Applicant: HONDA MOTOR CO., LTD., Tokyo (JP)

(72) Inventors: Hidemi Seki, Wako (JP); Christopher Lang, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 16/295,773

(22) Filed: Mar. 7, 2019

(65) Prior Publication Data

US 2019/0275858 A1 Sep. 12, 2019

(30) Foreign Application Priority Data

Mar. 7, 2018 (JP) .............................. JP2018-040324

(51) Int. Cl.
*B60H 1/00* (2006.01)
*B60H 1/22* (2006.01)

(52) U.S. Cl.
CPC ..... *B60H 1/00278* (2013.01); *B60H 1/00328* (2013.01); *B60H 1/00342* (2013.01); *B60H 1/00385* (2013.01); *B60H 1/00485* (2013.01); *B60H 1/00885* (2013.01); *B60H 1/00907* (2013.01); *B60H 1/22* (2013.01); *B60H 1/2221* (2013.01); *B60H 2001/00942* (2013.01)

(58) Field of Classification Search
CPC ............ B60H 1/00278; B60H 1/00328; B60H 1/00342; B60H 1/00385; B60H 1/00485; B60H 1/00885; B60H 1/00907; B60H 1/22; B60H 1/2221; B60H 2001/00942

USPC ......................................................... 165/202
See application file for complete search history.

(56) References Cited

U.S. PATENT DOCUMENTS

| 2016/0107508 A1* | 4/2016 | Johnston ............ B60H 1/00278 165/202 |
| 2017/0365901 A1* | 12/2017 | Hiramitsu ........... H01M 10/613 |

FOREIGN PATENT DOCUMENTS

| JP | 64-56348 U | 4/1989 |
| JP | 2003-275703 A | 9/2003 |
| JP | 2009-527395 A | 7/2009 |
| JP | 2013-254725 A | 12/2013 |
| JP | 2016-161186 A | 9/2016 |

(Continued)

OTHER PUBLICATIONS

Office Action dated Nov. 27, 2019, issued in counterpart JP Application No. 2018-040324, with English translation (9 pages).

*Primary Examiner* — Davis D Hwu
(74) *Attorney, Agent, or Firm* — Westerman, Hattori, Daniels & Adrian, LLP (57) ABSTRACT

A heat circulation system for a vehicle includes: an energy supply circuit that supplies heat energy supplied from a heat source to at least a vehicle cabin heater or a battery heater and cooler; and an energy absorption circuit that supplies cold energy supplied from a heat pump mechanism to at least a vehicle cabin cooler or the battery heater and cooler. The heat circulation system for a vehicle further includes a water circulation circuit, and the water circulation circuit includes at least one of a first heat exchanger that generates hot water by exchanging heat with the energy supply circuit and a second heat exchanger that generates cold water by exchanging heat with the energy absorption circuit.

16 Claims, 4 Drawing Sheets

(56) References Cited

FOREIGN PATENT DOCUMENTS

JP        2017-105425 A      6/2017

* cited by examiner

HEAT CIRCULATION SYSTEM FOR VEHICLE

CROSS REFERENCES TO RELATED APPLICATIONS

The present application claims priority under 35 U.S.C. § 119 to Japanese Patent Application No. 2018-040324, filed Mar. 7, 2018, entitled "Heat Circulation System for Vehicle." The contents of this application are incorporated herein by reference in their entirety.

BACKGROUND

1. Field

The present disclosure relates to a heat circulation system for a vehicle capable of generating hot water and cold water by utilizing air conditioner and a battery heating and cooling device which are provided in an automobile.

2. Description of the Related Art

The technique disclosed by Japanese Unexamined Patent Application Publication No. 2013-254725 is publicly known. The technique utilizes an air conditioner which heats or cools the cabin of an automobile, and heats the battery using a heating medium generated by the air conditioner at the time of heating as well as cools the battery using a cooling medium generated by the air conditioner at the time of cooling.

In addition, the heating/hot-water supply combined system disclosed by Japanese Unexamined Patent Application Publication (Translation of PCT Application) No. 2009-527395 is publicly known. The heating/hot-water supply combined system generates hot water by heating the water in a water tank using the heat of an air heating system which generates warm air for heating, and supplies the hot water to the outside/inside of the vehicle cabin from a water faucet.

Meanwhile, when users enjoy outdoor leisure with an automobile, readily available hot water and cold water provide significantly comfortable leisure time. Although the technique disclosed by Japanese Unexamined Patent Application Publication No. 2013-254725 is capable of heating and cooling the battery by utilizing an air conditioner of the vehicle cabin, there is a problem in that hot water and cold water cannot be supplied.

In addition, although the technique disclosed by Japanese Unexamined Patent Application Publication (Translation of PCT Application) No. 2009-527395 is capable of supplying hot water by utilizing the heater of an automobile, cold water cannot be supplied, and the thermal efficiency is low and uneconomical because hot air and hot water are generated by directly heating air and water with an air heater.

In consideration of the above-described situation, there is a need for providing a heat circulation system for a vehicle capable of supplying at least one of air conditioning of the vehicle cabin, heating and cooling of the battery, hot water, and cold water.

SUMMARY

In a first aspect of an embodiment according to the present invention, a heat circulation system for a vehicle is proposed, the heat circulation system for a vehicle including: an energy supply circuit (or line) that supplies heat energy supplied from a heat source to at least a vehicle cabin heater or a battery heater and cooler (a device configured to heat the battery when it needs to be heated and to cool the battery when it needs to be cooled); and an energy absorption circuit (or line) that supplies cold energy supplied from a heat pump mechanism to at least a vehicle cabin cooler or the battery heater and cooler. The heat circulation system for a vehicle further includes a water circulation circuit (or line) that exchanges heat with at least one of the energy supply circuit and the energy absorption circuit, and the water circulation circuit includes at least one of a first heat exchanger that generates hot water by exchanging heat with the energy supply circuit and a second heat exchanger that generates cold water by exchanging heat with the energy absorption circuit.

According to a second aspect of the embodiment, the heat circulation system for a vehicle according to the first aspect is proposed, in which the heat source is connected to both the vehicle cabin heater and the battery heater and cooler.

According to a third aspect of the embodiment, the heat circulation system for a vehicle according to the first or second aspect is provided, in which the heat pump mechanism is connected to both the vehicle cabin cooler and the battery heater and cooler. Thus, it is possible to reduce the cost by cooling both the vehicle cabin and the battery using a cooling medium generated by the heat pump mechanism.

According to a fourth aspect of the embodiment, the heat circulation system for a vehicle according to any one of the first to third aspects is provided, in which the energy supply circuit includes a first bypass passage that bypasses the vehicle cabin heater, and supplies a heating medium heated by the heat source to the first heat exchanger. Thus, hot water can be generated by the first heat exchanger concurrently with heating the vehicle cabin or without heating the vehicle cabin.

According to a fifth aspect of the embodiment, the heat circulation system for a vehicle according to any one of the first to fourth aspects is provided, in which the energy supply circuit includes a second bypass passage that bypasses the battery heater and cooler, and supplies a heating medium heated by the heat source to the first heat exchanger. Thus, hot water can be generated by the first heat exchanger concurrently with heating the battery or without heating the battery.

According to a sixth aspect of the embodiment, the heat circulation system for a vehicle according to any one of the first to fifth aspects is provided, in which the energy supply circuit and the energy absorption circuit include a change over (switching) valve that selectively supplies a heating medium or a cooling medium, which has passed the battery heater and cooler, to the first heat exchanger or the second heat exchanger. Thus, it is possible to prevent a cooling medium from being supplied to the first heat exchanger that generates hot water and to prevent a heating medium from being supplied to the second heat exchanger that generates cold water.

According to a seventh aspect of the embodiment, the heat circulation system for a vehicle according to any one of the first to sixth aspects is provided, in which the energy absorption circuit includes a third bypass passage that bypasses the battery heater and cooler, and supplies a cooling medium, which has been cooled by cold energy of the heat pump mechanism, to the second heat exchanger. Thus, cold water can be generated concurrently with cooling the battery or without cooling the battery.

According to an eighth aspect of the embodiment, the heat circulation system for a vehicle according to any one of the first to seventh aspects is provided, in which the water circulation circuit includes the first heat exchanger and the second heat exchanger in series. Thus, both hot water and cold water can be generated by a single water circulation circuit.

According to a ninth aspect of the embodiment, the heat circulation system for a vehicle according to the eighth aspect is provided, in which the water circulation circuit includes a fourth bypass passage that bypasses the first heat exchanger, and a fifth bypass passage that bypasses the second heat exchanger. Thus, hot water or cold water can be efficiently generated in a state where hot water and cold water are not mixed.

According to a 10th aspect of the embodiment, the heat circulation system for a vehicle according to any one of the first to seventh aspects is provided, in which the water circulation circuit includes a first water circulation circuit that generates hot water by exchanging heat with the energy supply circuit, and a second water circulation circuit that generates cold water by exchanging heat with the energy absorption circuit. Thus, storing and supplying of hot water and storing and supplying of cold water can be concurrently performed, and the convenience is further improved.

An electric heater 11 in the embodiment corresponds to the heat source in the present disclosure, a heater core 13 in the embodiment corresponds to the vehicle cabin heater in the present disclosure, a third passage change over valve 16 in the embodiment corresponds to the change over valve in the present disclosure, and an evaporator 26 in the embodiment corresponds to the vehicle cabin cooler in the present disclosure.

DESCRIPTION OF THE PREFERRED EMBODIMENTS

First Embodiment

Hereinafter, a first embodiment of the present disclosure will be described with reference to FIGS. 1 to 3.

Figure 1:
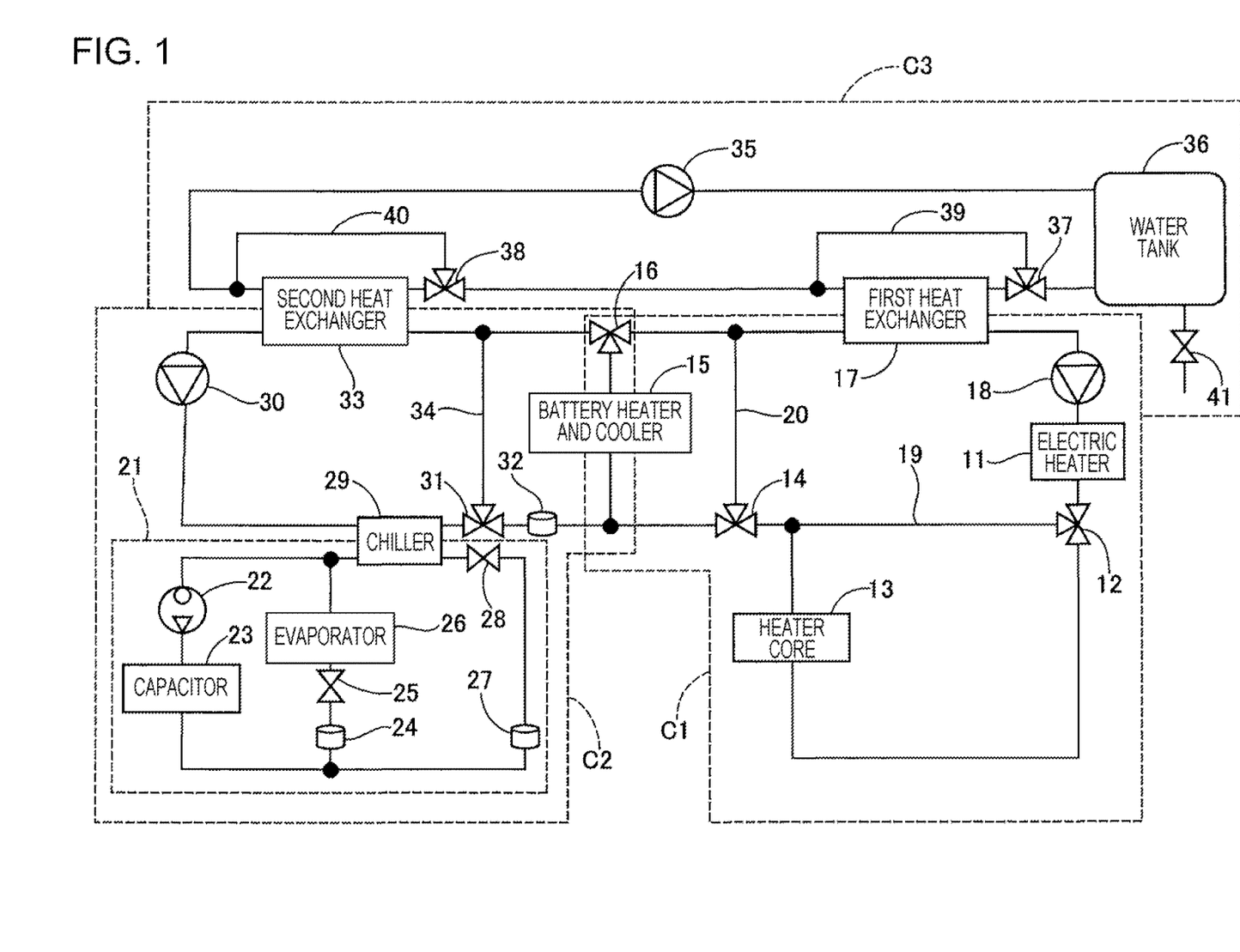
FIG. 1 is a circuit diagram of a heat circulation system for a vehicle (the first embodiment).

FIG. 1 illustrates the circuit diagram of a heat circulation system for a vehicle, which manages air conditioning of the vehicle cabin of an electric vehicle or a hybrid vehicle, temperature adjustment of the battery, and supply of hot water and supply of cold water. The heat circulation system for a vehicle includes an energy supply circuit C1, an energy absorption circuit C2, and a water circulation circuit C3.

In the energy supply circuit C1, the following components are disposed in series on a passage forming a closed circuit: an electric heater 11, a first passage change over valve 12 which is a three-way valve, a heater core 13 which is a heat exchanger that warms the vehicle cabin, a second passage change over valve 14 which is a three-way valve, a battery heater and cooler 15 that adjusts the temperature of a power source for driving, a third passage change over valve 16 which is a three-way valve, a first heat exchanger 17, and a first water pump 18. The first passage change over valve 12, and an intermediate portion between the heater core 13 and the second passage change over valve 14 are connected by a first bypass passage 19. The second passage change over valve 14, and an intermediate portion between the third passage change over valve 16 and the first heat exchanger 17 are connected by a second bypass passage 20.

A heat pump mechanism 21 of the energy absorption circuit C2 is a mechanism through which a cooling medium such as chlorofluorocarbon is circulated. The heat pump mechanism 21 includes: a compressor 22 that compresses a vaporized cooling medium to generate high temperature and high pressure; a capacitor 23 that exchanges heat with the outside air to cool and liquefy the cooling medium having high temperature high pressure coming out from the compressor 22; a first expansion valve 25 that is connected to a first cut-off valve 24 serving as an on-off valve on the downstream side of the capacitor 23, and that expands the liquefied cooling medium to generate low temperature and pressure; and an evaporator 26 that is a heat exchanger which performs heat exchange between the air inside the vehicle cabin and the cooling medium having low temperature and pressure coming out from the first expansion valve 25, and that supplies the cooled air to the inside of the vehicle cabin as cold air. The cooling medium, which has passed through the evaporator 26 and has been vaporized, is supplied to the compressor 22 again.

Also, in the heat pump mechanism 21, a second cut-off valve 27 which is an on-off valve, a second expansion valve 28, and a chiller 29 which is a heat exchanger are disposed in series on the passage that connects an intermediate portion between the capacitor 23 and the first cut-off valve 24, and an intermediate portion between the evaporator 26 and the compressor 22.

Furthermore in the energy absorption circuit C2, the following components are disposed in series on a passage forming a closed circuit: a second water pump 30, the above-mentioned chiller 29, a fourth passage change over valve 31 which is a three-way valve, a third cut-off valve 32 which is an on-off valve, the above-mentioned battery heater and cooler 15, the above-mentioned third passage change over valve 16, and a second heat exchanger 33. The fourth passage change over valve 31, and an intermediate portion between the third passage change over valve 16 and the second heat exchanger 33 are connected by a third bypass passage 34.

In water circulation circuit C3, the following components are disposed in series on a passage forming a closed circuit: a third water pump 35, a water tank 36, a fifth passage change over valve 37 which is a three-way valve, the above-mentioned first heat exchanger 17, a sixth passage change over valve 38 which is a three-way valve, and the above-mentioned second heat exchanger 33. The fifth passage change over valve 37, and an intermediate portion between the first heat exchanger 17 and the sixth passage change over valve 38 are connected by a fourth bypass passage 39. A sixth passage change over valve 38, and an intermediate portion between the second heat exchanger 33 and the third water pump 35 are connected by a fifth bypass passage 40.

The water tank 36, in which hot water or cold water is stored, is provided with a water supply valve 41 that supplies the hot water or the cold water to the inside or the outside of the vehicle cabin.

Next, the operation of an embodiment in the above-described configuration in the present disclosure will be described.

Figure 2:
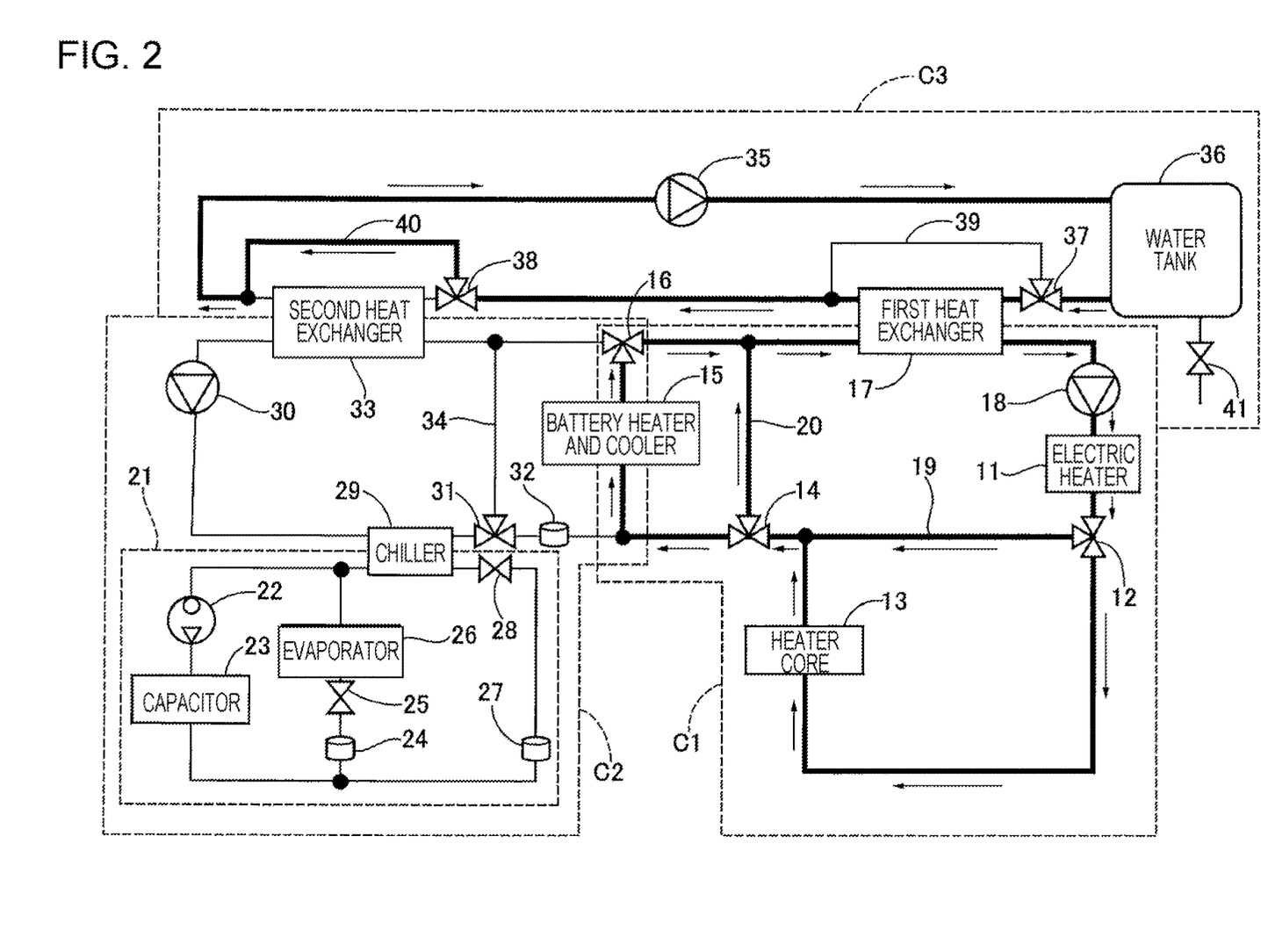
FIG. 2 is an operation explanatory diagram at the time of heating corresponding to FIG. 1 (the first embodiment).

As illustrated in FIG. 2, in order to heat the vehicle cabin, the first water pump 18 and the electric heater 11 are driven with the first bypass passage 19 closed by the first passage change over valve 12, the second bypass passage 20 opened by the second passage change over valve 14, and the third water pump 35 of the water circulation circuit C3 stopped. As a consequence, the water heated by the electric heater 11 is circulated through a closed circuit formed by the first passage change over valve 12, the heater core 13, the second passage change over valve 14, the second bypass passage 20, the first heat exchanger 17, and the first water pump 18, then heat exchange is performed between the heated water and the air inside the vehicle cabin by the heater core 13, thereby supplying warm air to the inside of the vehicle cabin to heat the vehicle cabin. At this point, the first heat exchanger 17 does not function because the third water pump 35 of the water circulation circuit C3 is stopped.

When the battery is heated concurrently with heating of the vehicle cabin, the third passage change over valve 16 is switched to the side of the energy supply circuit C1, communication with the energy absorption circuit C2 is cut off by closing the third cut-off valve 32, and the second bypass passage 20 is closed by the second passage change over valve 14. As a consequence, the water heated by the electric heater 11 is circulated through a closed circuit formed by the first passage change over valve 12, the heater core 13, the second passage change over valve 14, the battery heater and cooler 15, the third passage change over valve 16, the first heat exchanger 17, and the first water pump 18, thereby heating the battery concurrently with heating of the vehicle cabin.

When only the battery is heated without heating the vehicle cabin, the following operations may be performed: the first bypass passage 19 is opened by the first passage change over valve 12, the second bypass passage 20 is closed by the second passage change over valve 14, and the water heated by the electric heater 11 is thereby circulated through a closed circuit formed by the first passage change over valve 12, the first bypass passage 19, the second passage change over valve 14, the battery heater and cooler 15, the third passage change over valve 16, the first heat exchanger 17, and the first water pump 18.

Figure 3:
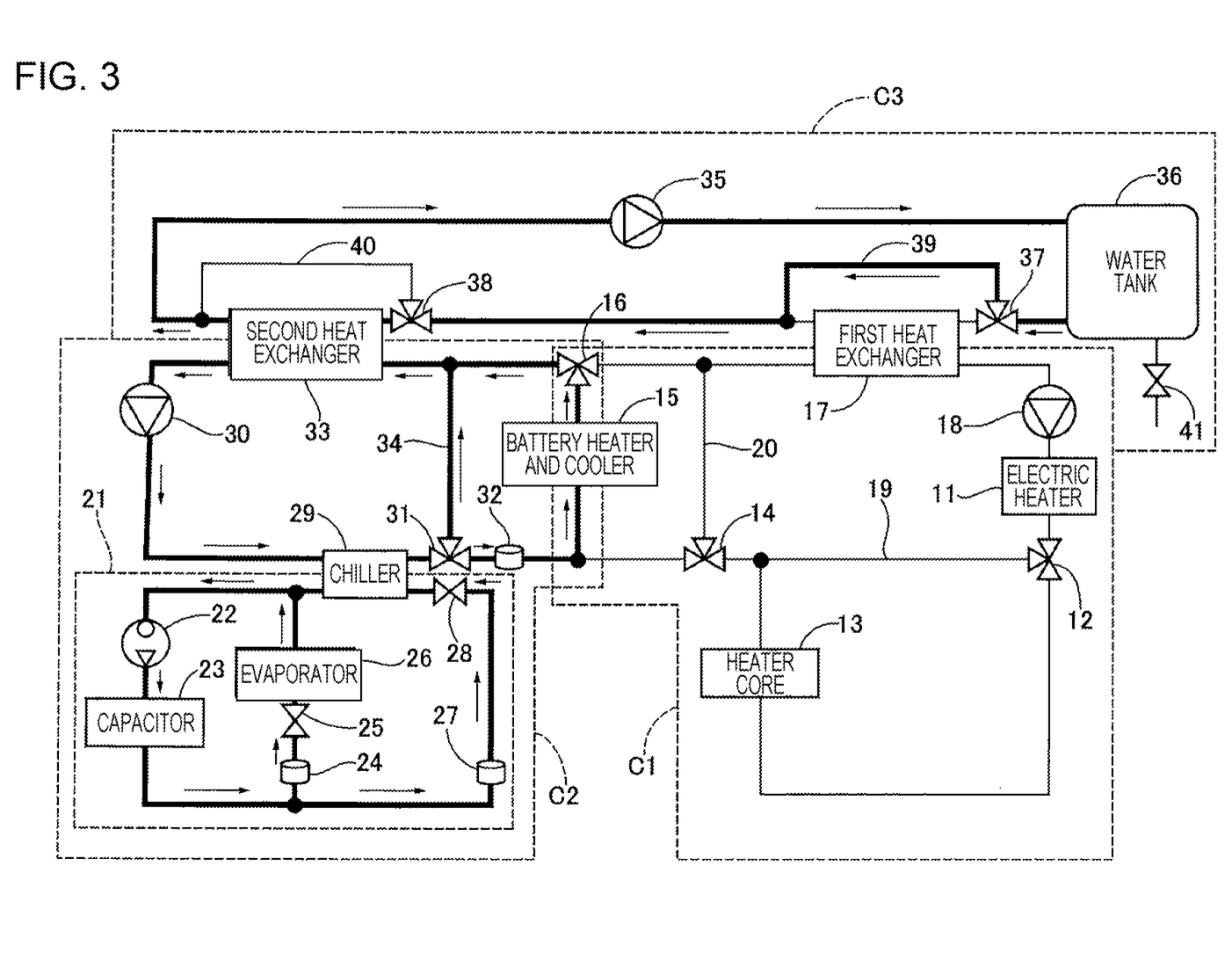
FIG. 3 is an operation explanatory diagram at the time of cooling corresponding to FIG. 1 (the first embodiment).

As illustrated in FIG. 3, when the vehicle cabin is cooled, the first cut-off valve 24 of the heat pump mechanism 21 of the energy absorption circuit C2 is opened, the second cut-off valve 27 is closed, the cooling medium having low temperature and pressure, which has passed through the first expansion valve 25, is supplied to the evaporator 26, and heat exchange between the air inside the vehicle cabin and the cooling medium having low temperature and pressure is performed, thereby supplying cold air to the inside the vehicle cabin to cool the vehicle cabin.

When it is necessary to cool the battery concurrently with cooling of the vehicle cabin, the second water pump 30 is driven with the second cut-off valve 27 of the heat pump mechanism 21 opened so that the cooling medium having low temperature and pressure, which has passed through the second expansion valve 28, is supplied to the chiller 29, the third bypass passage 34 closed by the fourth passage change over valve 31 of the energy absorption circuit C2, the third cut-off valve 32 opened, the third passage change over valve 16 switched to the side of the energy absorption circuit C2, and the third water pump 35 of the water circulation circuit C3 stopped. As a consequence, the water, which has passed through the chiller 29 and has been cooled, is circulated through a closed circuit formed by the fourth passage change over valve 31, the third cut-off valve 32, the battery heater and cooler 15, the third passage change over valve 16, the second heat exchanger 33, and the second water pump 30, thereby cooling the battery by the battery heater and cooler 15. When the battery is cooled without cooling the vehicle cabin, the following operations may be performed: the first cut-off valve 24 is closed, and the second cut-off valve 27 is opened. Although cold water passes through the second heat exchanger 33 while cooling the battery, the second heat exchanger 33 does not function because the third water pump 35 of the water circulation circuit C3 is stopped.

As illustrated in FIG. 2, during circulation of hot water through the energy supply circuit C1, when the third water pump 35 is driven with the fourth bypass passage 39 closed by the fifth passage change over valve 37, and the fifth bypass passage 40 opened by the sixth passage change over valve 38, the water in the water tank 36 is caused to exchange heat with the hot water of the energy supply circuit C1 by the first heat exchanger 17, and becomes hot water, which is circulated through the fifth bypass passage 40, the third water pump 35, the water tank 36, and the first heat exchanger 17, and thus the hot water is stored in the water tank 36. Consequently, hot water is available inside or outside the vehicle cabin by opening the water supply valve 41.

When only hot water is generated by the water circulation circuit C3 without heating the vehicle cabin as well as the battery, the following operations may be performed: the first bypass passage 19 is opened by the first passage change over valve 12 so that the hot water is caused to bypass the heater core 13, and the second bypass passage 20 is opened by the second passage change over valve 14 so that the hot water is caused to bypass the battery heater and cooler 15.

In contrast, as illustrated in FIG. 3, during circulation of cold water through the energy absorption circuit C2, when the third water pump 35 is driven with the fourth bypass passage 39 opened by the fifth passage change over valve 37 and the fifth bypass passage 40 closed by the sixth passage change over valve 38, the water in the water tank 36 is caused to exchange heat with the cold water of the energy absorption circuit C2 by the second heat exchanger 33, and becomes cold water, which is circulated through the third water pump 35, the water tank 36, the fourth bypass passage 39, and the second heat exchanger 33, and thus the hot cold is stored in the water tank 36. Consequently, cold water is available inside or outside the vehicle cabin by opening the water supply valve 41.

When only cold water is generated by the water circulation circuit C3 without cooling the vehicle cabin as well as the battery, the following operations may be performed: the first cut-off valve 24 is closed so that supply of a cooling medium to the evaporator 26 is cut off, and the third bypass passage 34 is opened by the fourth passage change over valve 31 so that cold water is caused to bypasses the battery heater and cooler 15.

As described above, according to the embodiment, since both heating of the vehicle cabin as well as heating of the battery are performed using the electric heater 11 of the energy supply circuit C1 as a common heat source, cost reduction can be achieved. In addition, since both cooling of the vehicle cabin as well as cooling of the battery are performed by the energy absorption circuit C2 using the evaporator 26 as a common cold source, cost reduction can be achieved.

Moreover, since the existing energy supply circuit C1 provided for heating of the vehicle cabin or heating of the battery, and the existing energy absorption circuit C2 provided for cooling of the vehicle cabin or cooling of the battery are connected to the water circulation circuit C3, hot water and cold water can be generated with low cost by utilizing the heating medium of the energy supply circuit C1 and the cooling medium of the energy absorption circuit C2.

In addition, since the energy supply circuit C1 includes the first bypass passage 19 that bypasses the heater core 13, and the second bypass passage 20 that bypasses the battery heater and cooler 15, it is possible to switch between a driving mode in which both heating of the vehicle cabin and heating of the battery are performed, a driving mode in which heating of the vehicle cabin is performed and heating of the battery is stopped, and a driving mode in which heating of the vehicle cabin is stopped and heating of the battery is performed in any manner. Moreover, hot water can be generated by supplying a heating medium to the first heat exchanger 17 of the water circulation circuit C3 in any driving mode.

In addition, since the energy absorption circuit C2 includes the first cut-off valve 24 that cuts off supply of a cooling medium to the evaporator 26, and the third bypass passage 34 that bypasses the battery heater and cooler 15, it is possible to switch between a driving mode in which both cooling of the vehicle cabin and cooling of the battery are performed, a driving mode in which cooling of the vehicle cabin is performed and cooling of the battery is stopped, and a driving mode in which cooling of the vehicle cabin is stopped and cooling of the battery is performed in any manner. Moreover, cold water can be generated by supplying a cooling medium to the second heat exchanger 33 of the water circulation circuit C3 in any driving mode.

Also, the passage on the downstream of the battery heater and cooler 15 is selectively connected to the energy supply circuit C1 or the energy absorption circuit C2 by the third passage change over valve 16, it is possible to prevent a cooling medium from being supplied to the first heat exchanger 17 that generates hot water, and to prevent a heating medium from being supplied to the second heat exchanger 33 that generates cold water.

Furthermore, since the first heat exchanger 17 and the second heat exchanger 33 are disposed in series in the water circulation circuit C3, both hot water and cold water can be generated by the single water circulation circuit C3, and yet hot water or cold water can be efficiently generated without mixture of the hot water and the cold water due to installation of the fourth bypass passage 39 that bypasses the first heat exchanger 17 and the fifth bypass passage 40 that bypasses the second heat exchanger 33.

Second Embodiment

Figure 4:
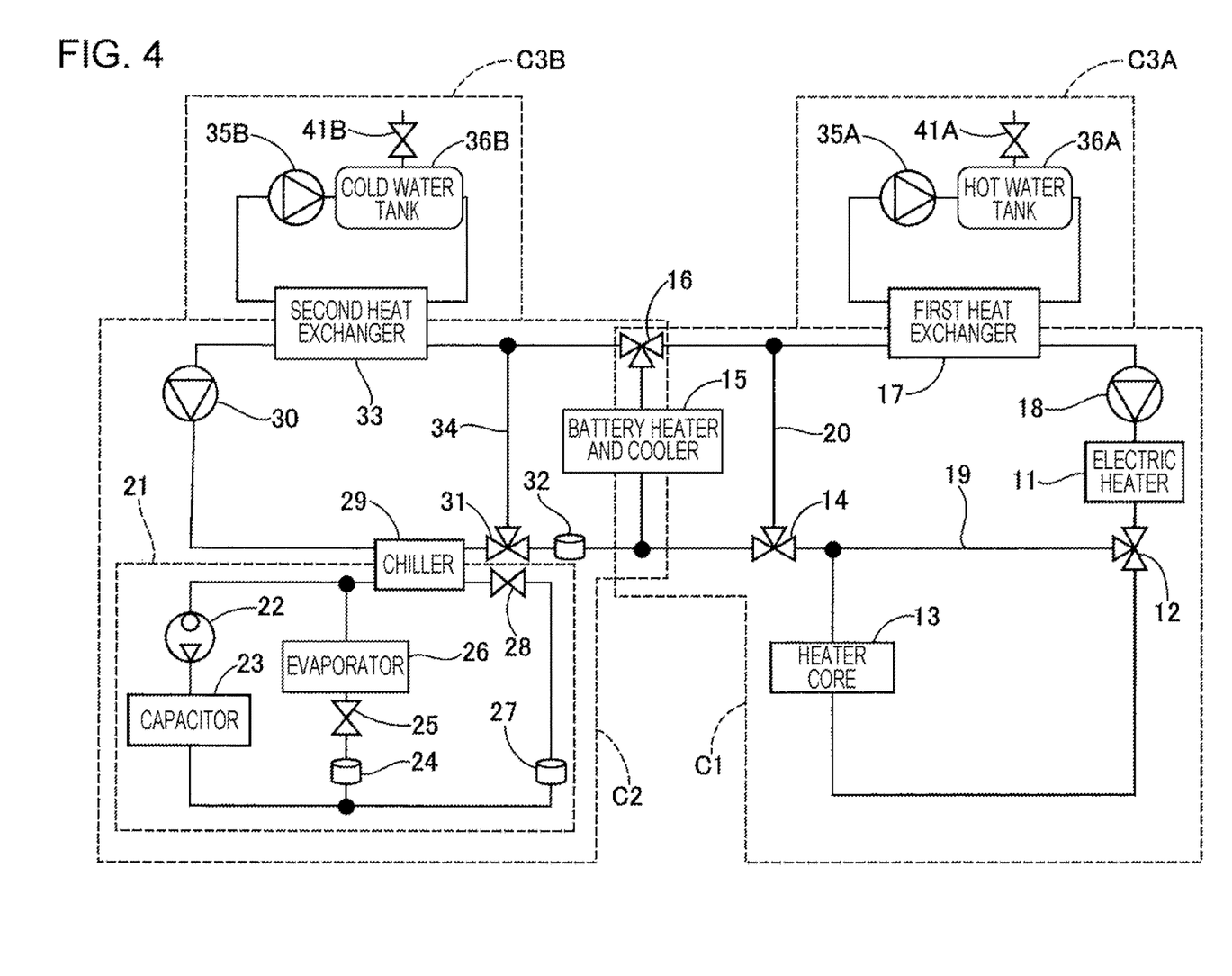
FIG. 4 is a circuit diagram of the heat circulation system for a vehicle (the second embodiment).

Next, a second embodiment of the present disclosure will be described with reference to FIG. 4.

In the first embodiment, the single water circulation circuit C3 includes both the first heat exchanger 17 and the second heat exchanger 33, however, in the second embodiment, there are provided a first water circulation circuit C3A and a second water circulation circuit C3B which are separated from each other. The first water circulation circuit C3A includes a fourth water pump 35A, a hot water tank 36A, and a hot water supply valve 41A on a closed circuit, and the second water circulation circuit C3B includes a fifth water pump 35B, a cold water tank 36B, and a cold water supply valve 41B on a closed circuit.

According to the embodiment, since hot water can be stored in the hot water tank 36A of the first water circulation circuit C3A, and cold water can be stored in the cold water tank 36B of the second water circulation circuit C3B, hot water and cold water can be concurrently utilized, and the convenience is further improved.

Although the embodiments of the present disclosure have been described above, various design changes may be made in the scope without departing from the spirit of the present disclosure.

For instance, the water circulation circuit C3 in the embodiment includes both the first heat exchanger 17 and the second heat exchanger 33, however, the water circulation circuit C3 may include only one of the heat exchangers 17, 33.

In addition, the heat source for heating, battery heating, and hot water generation is not limited to the electric heater 11 in the embodiment, and may be another heat source such as coolant having a high temperature for the engine.

What is claimed is:

1. A heat circulation system for a vehicle, comprising:
    an energy supply circuit configured to supply heat energy supplied from a heat source to at least a vehicle cabin heater or a battery heater and cooler;
    an energy absorption circuit configured to supply cold energy supplied from a heat pump mechanism to at least a vehicle cabin cooler or the battery heater and cooler;
    a water circulation circuit having at least one of:
        a first heat exchanger configured to generate hot water by exchanging heat with the energy supply circuit; and
        a second heat exchanger configured to generate cold water by exchanging heat with the energy absorption circuit; and
        a water supply valve configured to supply the hot water from the first heat exchanger or the cold water from the second heat exchanger such that the hot water or the cold water is available inside or outside a vehicle cabin,
    wherein the energy supply circuit and the energy absorption circuit comprise a change over valve configured to selectively supply one of a heating medium and a cooling medium, which has passed the battery heater and cooler, to the first heat exchanger or the second heat exchanger.

2. The heat circulation system for the vehicle according to claim 1,
    wherein the heat source is connected to each of the vehicle cabin heater and the battery heater and cooler.

3. The heat circulation system for the vehicle according to claim 1,
    wherein the heat pump mechanism is connected to each of the vehicle cabin cooler and the battery heater and cooler.

4. The heat circulation system for the vehicle according to claim 1,
    wherein the energy supply circuit comprises a first bypass passage configured to bypass the vehicle cabin heater and supply a heating medium heated by the heat source to the first heat exchanger.

5. A heat circulation system for a vehicle, comprising:
    an energy supply circuit configured to supply heat energy supplied from a heat source to at least a vehicle cabin heater or a battery heater and cooler;
    an energy absorption circuit configured to supply cold energy supplied from a heat pump mechanism to at least a vehicle cabin cooler or the battery heater and cooler; and
    a water circulation circuit having at least one of:
        a first heat exchanger configured to generate hot water by exchanging heat with the energy supply circuit; and a second heat exchanger configured to generate cold water by exchanging heat with the energy absorption circuit, wherein the energy supply circuit comprises a second bypass passage configured to bypass the battery heater and cooler and supply a heating medium heated by the heat source to the first heat exchanger.

6. A heat circulation system for a vehicle, comprising:

an energy supply circuit configured to supply heat energy supplied from a heat source to at least a vehicle cabin heater or a battery heater and cooler;

an energy absorption circuit configured to supply cold energy supplied from a heat pump mechanism to at least a vehicle cabin cooler or the battery heater and cooler; and a water circulation circuit having at least one of:
　a first heat exchanger configured to generate hot water by exchanging heat with the energy supply circuit; and
　a second heat exchanger configured to generate cold water by exchanging heat with the energy absorption circuit, wherein the energy absorption circuit comprises a third bypass passage configured to bypass the battery heater and cooler and supply a cooling medium, which has been cooled by cold energy of the heat pump mechanism, to the second heat exchanger.

7. The heat circulation system for the vehicle according to claim 1, wherein the water circulation circuit comprises the first heat exchanger and the second heat exchanger which are connected to each other in series.

8. The heat circulation system for the vehicle according to claim 7, wherein the water circulation circuit comprises a fourth bypass passage configured to bypass the first heat exchanger, and a fifth bypass passage configured to bypass the second heat exchanger.

9. The heat circulation system for the vehicle according to claim 1, wherein the water circulation circuit comprises a first water circulation circuit configured to generate hot water by exchanging heat with the energy supply circuit, and a second water circulation circuit configured to generate cold water by exchanging heat with the energy absorption circuit.

10. The heat circulation system for the vehicle according to claim 1, further comprising a water tank configured to store the hot water generated by the first heat exchanger or the cold water generated by the second heat exchanger.

11. The heat circulation system for the vehicle according to claim 5, wherein the water circulation circuit comprises the first heat exchanger and the second heat exchanger which are connected to each other in series.

12. The heat circulation system for the vehicle according to claim 11, wherein the water circulation circuit comprises a fourth bypass passage configured to bypass the first heat exchanger, and a fifth bypass passage configured to bypass the second heat exchanger.

13. The heat circulation system for the vehicle according to claim 5, wherein the water circulation circuit comprises a first water circulation circuit configured to generate hot water by exchanging heat with the energy supply circuit, and a second water circulation circuit configured to generate cold water by exchanging heat with the energy absorption circuit.

14. The heat circulation system for the vehicle according to claim 6, wherein the water circulation circuit comprises the first heat exchanger and the second heat exchanger which are connected to each other in series.

15. The heat circulation system for the vehicle according to claim 14, wherein the water circulation circuit comprises a fourth bypass passage configured to bypass the first heat exchanger, and a fifth bypass passage configured to bypass the second heat exchanger.

16. The heat circulation system for the vehicle according to claim 6, wherein the water circulation circuit comprises a first water circulation circuit configured to generate hot water by exchanging heat with the energy supply circuit, and a second water circulation circuit configured to generate cold water by exchanging heat with the energy absorption circuit.

* * * * *